United States Patent [19]

Stol

[11] Patent Number: 4,514,614

[45] Date of Patent: Apr. 30, 1985

[54] PRESSURE-DIFFERENTIAL METHOD FOR SLEEVE-TO-TUBE JOINING

[75] Inventor: Israel Stol, Monroeville, Pa.

[73] Assignee: Westinghouse Electric Corp., Pittsburgh, Pa.

[21] Appl. No.: 409,208

[22] Filed: Aug. 18, 1982

[51] Int. Cl.³ .............................................. B23K 9/16
[52] U.S. Cl. ................................ 219/125.11; 219/60.2
[58] Field of Search ............... 219/125.11, 60.2, 60 A, 219/60 R

[56] References Cited

U.S. PATENT DOCUMENTS

| | | | |
|---|---|---|---|
| 2,868,953 | 1/1959 | Gardner, Jr. | 219/60.2 |
| 3,461,269 | 8/1969 | Stevens et al. | 219/60.2 |
| 3,493,716 | 2/1970 | Martin | 219/60.2 |
| 3,754,115 | 8/1973 | Roberts et al. | 219/60.2 X |

Primary Examiner—C. L. Albritton
Assistant Examiner—Catherine M. Sigda
Attorney, Agent, or Firm—L. A. De Paul

[57] ABSTRACT

The pressure-differential method for sleeve-to-tube joining comprises inserting a sleeve within a tube and joining the sleeve to the tube. An internal heating device is then inserted into the sleeve for bonding the sleeve to the tube. The portion of the sleeve to be joined is then sealed so that the portion of the sleeve to be joined may be internally pressurized. Once the sleeve has been·so pressurized, the heating operation may be begun. In the case of welding, as the welding progresses the molten weld pool under the arc is continuously driven by the internal pressure gradient toward the external tube. In this manner the arc force is cushioned by the molten pool at all times thus preventing the weld arc from piercing through the sleeve. In the case of brazing, as the heating progresses the sleeve becomes more pliable such that the internal pressure causes the sleeve and braze material to closely contact the inner surface of the tube.

10 Claims, 5 Drawing Figures

PRESSURE-DIFFERENTIAL METHOD FOR SLEEVE-TO-TUBE JOINING

CROSS-REFERENCE TO RELATED APPLICATION

This application is related to copending application Ser. No. 409,209 filed herewith in the name of R. M. Kobuck et al. and entitled "Sleeve-To-Tube Welder".

BACKGROUND OF THE INVENTION

This invention relates to metallurgical bonding methods and more particularly to welding or brazing methods for welding or brazing a sleeve within a tube.

In tube-type heat exchangers, a first fluid flows through the tubes of the heat exchanger while a second fluid surrounds the outside of the tubes such that heat exchange occurs between the two fluids. Occasionally, one of the tubes can become defective such that a leak occurs therein which allows the fluids to mingle. When this occurs, it is sometimes necessary to either plug the tube so that the fluid does not flow through the tube or repair the tube, thereby preventing leakage from the tube.

In nuclear reactor power plants, the tube-type heat exchangers are commonly referred to as steam generators. When a defect occurs in a tube of a nuclear steam generator that allows the coolant in the tube to mingle with the coolant outside of the tube, a more significant problem arises. Not only doesthissituation create an in effective heat exchanger, but it also creates a radioactive contamination problem. Since the fluid flowing in the tubes of the nuclear steam generator is generally radioactive, it is important that it not be allowed to leak from the tubes and contaminate the fluid surrounding the tubes. Therefore, when a leak occurs in a nuclear steam generator heat exchange tube, the heat exchange tube must either be plugged or repaired so that the coolant does not leak from the tube. This prevents contamination of the fluid surrounding the tubes.

There are several methods known in the art for repairing heat exchange tubes; however, many of these methods are not applicable to repair of heat exchange tubes wherein the tube is not readily accessible. For example, in a nuclear steam generator the physical inaccessibility of defective heat exchange tubes and the radioactive nature of the environment surrounding the heat exchange tubes presents unique problems to repairing heat exchange tubes that do not normally exist in other heat exchangers. For these reasons, special methods have been developed for repairing heat exchange tubes in nuclear steam generators. Typically, the method used to repair a heat exchange tube in a nuclear steam generator is one in which a metal sleeve having an outside diameter slightly smaller than the inside diameter of the defective tube is inserted into the defective tube and attached to the defective tube to bridge the defective area of the tube. This type of repair method is generally referred to as "sleeving". Previous sleeving development work has been concerned with obtaining a relatively leakproof joint between the sleeve and the tube by brazing, arc welding, explosive welding, orotherjoining means. Due to the need for cleanliness, close fittings, heat application, and atmospheric control, these metallurgical bonding techniques have problems which are noteasilysolvable in areas such as a nuclear steam generator where human access is limited.

In the braze sleeving methods such as the one described in U.S. patent application Ser. No. 185,654, filed Sept. 9, 1980 in the name of R. D. Burack and entitled "Gold Braze Sleeving Method" which is assigned to the Westinghouse Electric Corporation, it is necessary to heat the braze metal in order to form the braze bond between the sleeve and the tube. One way to heat the braze material is by inserting a heating apparatus in the sleeve so as to internally heat the sleeve and the braze material. However, due to the inaccessibility of the work area, the power requirements for the heating apparatus, and the need to carefully control the brazing times and temperatures, a specially designed internal brazing wand is recommended for use in such a process.

In welding methods for internally welding sleeves to tubes in heat exchangers, special problems arise that must be solved in order to establish an effective weld joint between the sleeve and the tube. For example, commonly the sleeve is internally expanded into contact with the tube for establishing a contact surface between the sleeve and the tube for either brazing or welding. However, despite the internal expansion of the sleeve against the tube, it is not always possible to achieve a consistently uniform contact between the sleeve and the tube. When subjected to an internal welding arc, the non-uniform contact between the sleeve surface and the tube surface can lead to a non-uniform thermal contact resistance. Near the location of intimate contact between the sleeve and the tube, the heat from the welding arc is conducted more readily away through both sleeve and the tube than it does about the portion where there is no contact therebetween. At the non-contact segment of the sleeve-tube interface, the arc's heat must be dissipated by the members' thin walls. Because of the limited "two-dimensional" heat conduction, the heat tends to accumulate about the fusion zone and slows down the solidification rate of the molten pool. As the surface tension of the pool is lowered inversely to its temperature, it might be overcome by the arc force and rupture the molten pool. This allows the arc to pierce through the sleeve and directly impinge upon the internal surface of the tube. Even if the weld pool is not ruptured by this mechanism, limited conductivity from the weld pool to the external tube may result in erratic fusion between the sleeve and the tube.

Another problem that amy develop in internally welding a sleeve to a tube is that as the sleeve begins to be welded to the tube, the sleeve may tend to be pulled toward the side of the tube where the welding is initiated causing a gap to develop diametrically opposite to that point between the sleeve and the tube. This may result in a non-uniform contact between the sleeve and the tube with resultant non-uniform thermal contact resistance.

Moreover, distortion between the tube and the sleeve may be caused by stress relief of the expanded sleeve. Because the expanded sleeve has residual stresses locked into its structure, the sleeve candistortas it is heated thereby relieving the stress. As a result, misalignment between the sleeve and tube and non-uniform contact between the sleeve and the tube may result.

An optimized sleeve-to-tube joining method would assure consistently uniform temperature distribution and arc force between the sleeve and the tube at their interface, which would alleviate the non-uniform contact problem. Therefore, what is needed is an internal sleeve-to-tube joining method wherein a substantially uniform contact between the sleeve and tube is maintained thereby establishing a substantially uniform thermal contact resistance between the sleeve and the tube to produce a quality joint therebetween.

SUMMARY OF THE INVENTION

The pressure-differential method for sleeve-to-tube joining comprises inserting a sleeve within a tube and joining the sleeve to the tube. An internal heating device is then inserted into the sleeve for bonding the sleeve to the tube. The portion of the sleeve to be joined is then sealed so that the portion of the sleeve to be joined may be internally pressurized. Once the sleeve has been so pressurized, the heating operation may be begun. In the case of welding, as the welding progresses the molten weld pool under the arc is continuously driven by the internal pressure gradient toward the external tube. Inthis manner the arc force is cushioned by the molten pool at all times thus preventing the weld arc from piercing through the sleeve. In the case of brazing, as the heating progresses the sleeve becomes more pliable such that the internal pressure causes the sleeve and braze material to closely contact the inner surface of the tube.

BRIEF DESCRIPTION OF THE DRAWINGS

While the specification concludes with claims particularly pointing out and distinctly claiming the subject matter of the invention, it is believed the invention will be better understood from the following description, taken inconjunction with the accompanying drawings, wherein:

DESCRIPTION OF THE PREFERRED EMBODIMENT

Internally joining sleeves in heat exchange tubes requires that the joining method and apparatus be capable of joining the sleeve to the tube even where there may be slight non-uniform contact surfaces between the sleeve and the tube. The invention described herein is a joining method capable of producing a bond between a sleeve in a tube.

Figure 1:
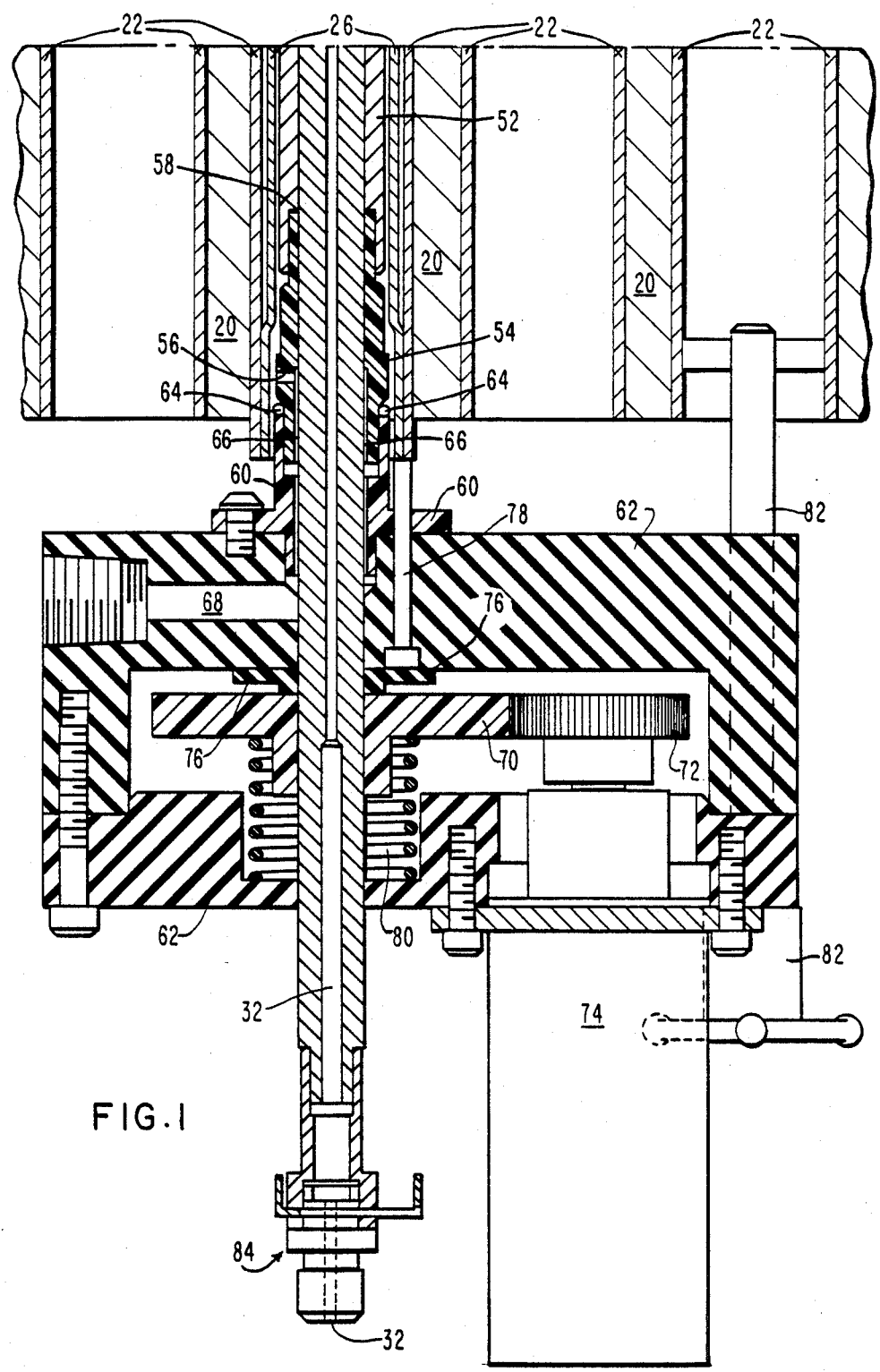
FIG. 1 is a cross-sectional view in elevation of the lower portion of the welding apparatus.
Figure 2:
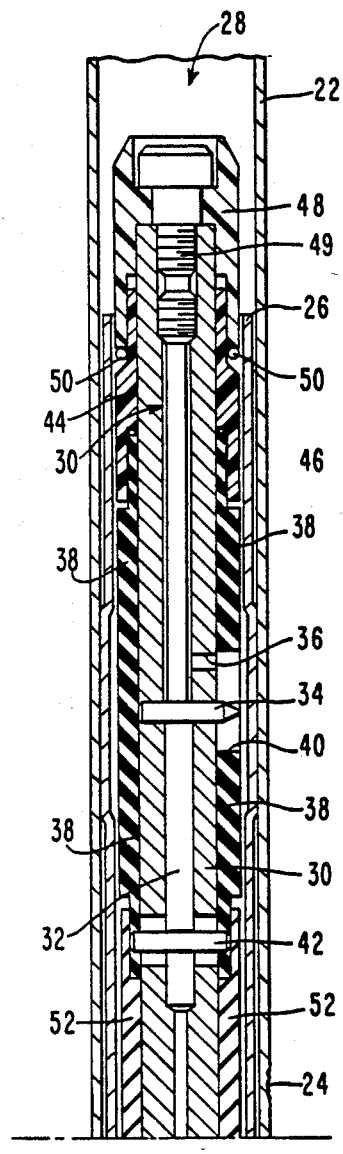
FIG. 2 is a cross-sectional view in elevation of the upper portion of the welding apparatus.

Referring to FIGS. 1 and 2, a heat exchanger tube sheet which may be a tube sheet of a nuclear steam generator, referred to generally as 20, is provided with a plurality of holes extending therethrough for accommodating a plurality of heat exchange tubes 22. Should a leak or a defect 24 occur in one of the heat exchange tubes 22 somewhere beyond tubes sheet 20, it may be necessary to insert a metal sleeve 26 in tube 22 to bridge defect 24 thereby preventing leakage of the heat transfer medium through the defect 24. Sleeve 26 may be made of a high temperature corrosion resistant material such as Inconel. Once sleeve 26 has been inserted in tube 22, limited portions of sleeve 26 located above and below defect 24 may be internally expanded into contact with tube 22 as shown in the drawings. The internal expansion of sleeve 26 may be accomplished by a commonly available mechanism such as an internal hydraulic expander. Once sleeve 26 has been internally expanded into contact with tube 22, welding apparatus 28 may be inserted into sleeve 26.

Welding apparatus 28 which may be a gas tungsten arc welding device may comprise a central shaft 30 extending the length of welding apparatus 28 and capable of being inserted into sleeve 26. Central shaft 30 may be made of an electrically conductive material such as copper for conducting an electrical current therethrough. Central shaft 30 may also have a center bore 32 extending the length thereof for conducting an inert shielding gas therethrough and to the area to be welded. A welding electrode 34 which may be a tungsten-2% thoriated electrode may be attached to central shaft 30 in the area of central shaft 30 near the portion of the sleeve 26 to be welded to tube 28. Welding electrode 34 extends from central shaft 30 to near sleeve 26. Central shaft 30 may have a transversed first hole 36 therein near welding electrode 34 for allowing the inert gas to pass from center bore 32 and through first hole 36 to near the area of welding electrode 34. A first insulating member 38 is disposed over central shaft 30 in the portion of central shaft 30 wherein welding electrode 34 is located. First insulating member 38 may be an electrically insulating material for use in a high-temperature environment such as a ceramic material or a boron nitride or aluminum oxide material.

The purpose of insulating member 38 is to electrically insulate central shaft 30 from sleeve 26 to Prevent the flow of electrical current from central shaft 30 to sleeve 26 while allowing flow of electric current from central shaft 30 to welding electrode 34 and to the area to be welded. First insulating member 38 has an aperture 40 therein for allowing welding electrode 34 to extend from central shaft 30 through first insulating member 38 to near sleeve 26 where the weld is to be created. A pin 42 is disposed through central shaft 30 and connected to first insulating member 38 for attaching first insulating member 38 to central shaft 30 and while permitted relative movement therebetween. First spacer 44 is disposed over central shaft 30 and over a portion of first insulating member 38 near the top end of central shaft 30. First spacer 44 may be made of a nylon or plastic material such as Delrin or may be a ceramic material such as boron nitride and provides a transition mechanism at the end of first insulating member 38. A first washer 46 which may be an elastomer 0-ring may be disposed around central shaft 30 and between first insulating member 38 and first spacer 44 for creating a gas seal therebetween and preventing the escape of the shielding gas therethrough. An end cap 48 which may be made of a nylon or plastic material such as Delrin is disposed over the end of central shaft 30 and connected thereto by means of a screw 49. End cap 48 is also slidably disposed over the upper portion of first spacer 44. A first seal 50 which may be an elastomer 0-ring is disposed around first spacer 44 and on a ledge thereof and between first spacer 44 and end cap 48. When central shaft 30 is moved downwardly relative to first spacer 44, end cap 48 which is attached to central shaft 30 also moves downwardly relative to first spacer 44. When end cap 48 is thus moved downwardly relative to first spacer 44, first seal 50 is squeezed between end cap 48 and first spacer 44 so as to cause first seal 50 to contact the inner surface of sleeve 26 as shown in FIG.

3. In this manner, first seal 50 Prevents leakage of the shileding gas from the annulus between sleeve 26 and welding apparatus 28. A second insulating member 52 which may be made of a material such as Micarta is disposed over central shaft 30 below first insulating member 38. Second insulating member 52 also extends over a portion of first insulating member 38 and in contact therewith.

Figure 3:
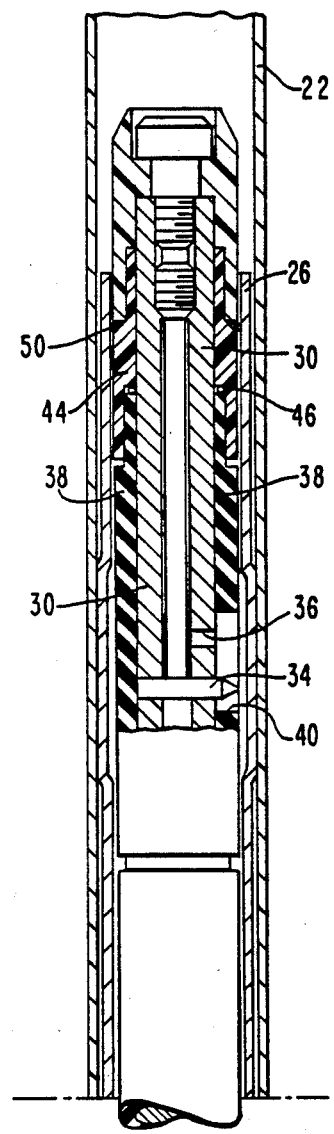
FIG. 3 is a cross-sectional view in elevation of the upper portion of the welding apparatus in the sealed position.
Figure 4:
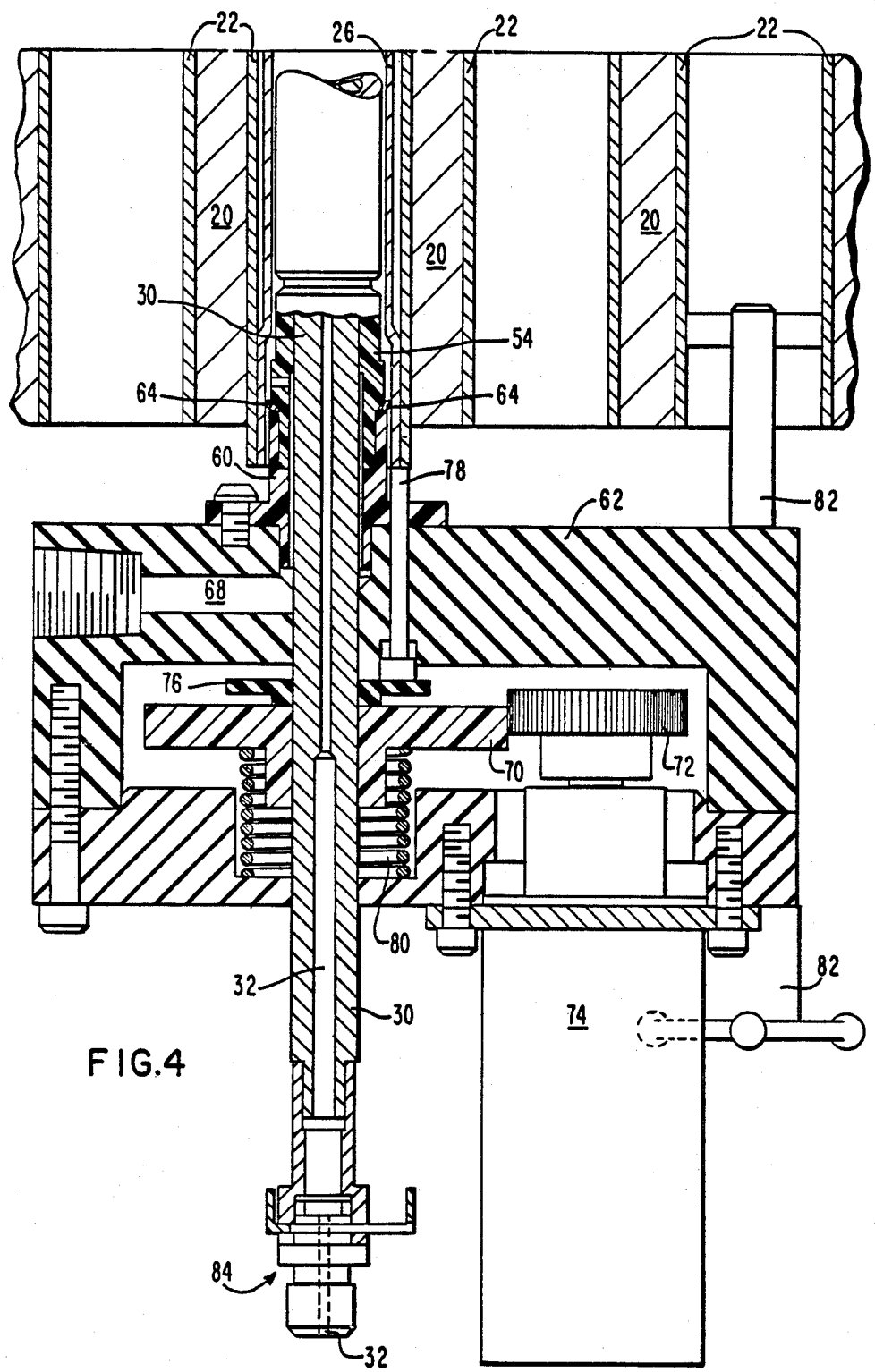
FIG. 4 is a cross-sectional view in elevation of the lower portion of the welding apparatus in the sealed position.

A second spacer 54 may be disposed around the lower end of central shaft 30 and in contact with second insulating member 52. Second spacer 54 may be a nylon or plastic member manufactured from a material such as Delrin. Second spacer 54 has a first channel 56 disposed therethrough for allowing the shielding gas to pass therethrough. A second washer 58 may be disposed around central shaft 30 and between second insulating member 52 and second spacer 54 for sealing the passage therebetween so as to prevent the flow of the inert gas therethrough. A flange 60 which may be manufactured from a material such as plastic ornylon is mounted on housing 62 and disposed around central shaft 30 and a portion of second spacer 58. A second seal 64 which may be an elastomer 0-ring type seal is disposed around second spacer 54 and on the ledge thereof between second spacer 54 and flange 60 such that when second spacer 54 is moved downwardly relative to flange 60, second seal 64 is expanded outwardly and into contact with the inside surface of sleeve 26 as shown in FIG. 4. In this manner a seal is created between flange 60 and sleeve 26. When both first seal 50 and second seal 64 are expanded as shown in FIGS. 3 and 4, an annulus is defined between the outer surface of welding apparatus 28 disposed within sleeve 26 and the inner surface of sleeve 26. This annulus creates a chamber wherein the inert gas may be contained for pressurizing the weld area.

A first annulus 66 is defined between second spacer 54 and central shaft 30 and between flange 60 and central shaft 30. A second channel 68 is formed in housing 62 in fluid communication with first annulus 66 for providing a means by which the shielding gas may be removed from welding apparatus 28. A pressure regulating device (not shown) may be connected to second channel 68 for regulating the pressure of the welding process. It can be seenthatthe shielding gas may be introduced to the welding apparatus 28 through center bore 32 and out through first hole 36. From first hole 36, the shielding gas may enter the area to be pressurized for welding which is the annulus defined between welding apparatus 28 and sleeve 26. This annulus extends down to and in fluid communication with first channel 56. Since first channel 56 is in fluid communication with first annulus 66 and second channel 68, the shielding gas may be removed from the welding apparatus through second channel 68 thereby regulating the pressure of the welding process.

Central shaft 30 extends through housing 62 and is attached to first gear 70 which may be made of a nylon or plastic material such as Delrin. First gear 70 is connected to second gear 72 which is connected to drive mechanism 74. Drive mechanism 74 which may be a DC gear motor with a 935:1 gear reduction capable of 3-10 RPM at 150 in-oz torque (min) is mounted on housing 62. When drive mechanism 74 is energized, second gear 72 is driven which causes first gear 70 to be driven. The rotation of first gear 70 causes-central shaft 30 to rotate within sleeve 26 In this manner, welding electrode 34 can be rotated more than 360° around the longitudinal axis of central shaft 30 thereby completing an entire weld of sleeve 26 to tube 22.

A second flange 76 is disposed around central shaft 30 and disposed on first gear 70. A metal plunger 78 is slidably disposed within housing 62 and arranged to contact, at one end the bottom ends of sleeve 26 and tube 22, and at the other end to contact second flange 76. Since second flange 76 and housing 62 are made of electrically insulating material, central shaft 30 is electrically insulated from plunger 78 thereby insulating central shaft 30 from sleeve 26 and tube 22. A biasing mechanism 80 which may be a coil spring is disposed around central shaft 30 and in contact with first gear 70 and housing 62 for urging second gear 72 and central shaft 30 upwardly relative to housing 62.

A plurality of attachment mechanisms 82 are connected to housing 62 and capable of being disposed in one or more tubes 22 for suspending housing 62 from tube sheet 20. Attachment mechanisms 82 may be manually or automatically actuated camlocks chosen from those well known in the art. Welding apparatus 28 may be either manually or remotely inserted into a selected sleeve 26 such that one or more attachment mechanisms 82 are similarly inserted into one or more tubes 22 for suspending housing 62 and welding apparatus 28 therefrom. Since central shaft 30 is slidably disposed within housing 62, as housing 62 is moved toward tube sheet 20, plunger 78 contacts the bottom ends of sleeve 26 and tube 22 which causes second flange 76 and first gear 70 together with central shaft 30 to move downwardly relative to housing 62 as shown in FIGS. 3 and 4. The relative downward motion of central shaft 30 causes end cap 48 to also move downwardly relative to sleeve 26. Since first spacer 44, first insulating member 38, second insulating member 52, and second spacer 54 are slidably disposed on central shaft 30 and since the downward motion of second spacer 54 is limited by the non-relative motion of flange 60, the downward motion of central shaft 30 causes first seal 50 and second seal 64 to be squeezed into contact with sleeve 26, thereby defining an annulus between welding apparatus 28, sleeve 26, first seal 50, and second seal 64. This annulus thereby provides a gas space for the flow and pressurization of the inert gas that may be introduced through center bore 32 during the welding process.

A quick disconnect mechanism 84 may be provided on the lower end of central shaft 30 for allowing the attachment to the lower end of central shaft 30 of a gas supply means and an electrical supply means (not shown). The gas supply means may be one chosen from those well known in the art and be capable of supplying an inert gas such as argon at a pressure of between 5 psi and 150 psi and at a rate of 1-30 cfh. Similarly, the electrical supply means is connected to central shaft 30 and is capable of supplying an electrical current at 5-15 volts and 150 amperes to central shaft 30 and welding electrode 34 for performing the welding process.

OPERATION

Figure 5:
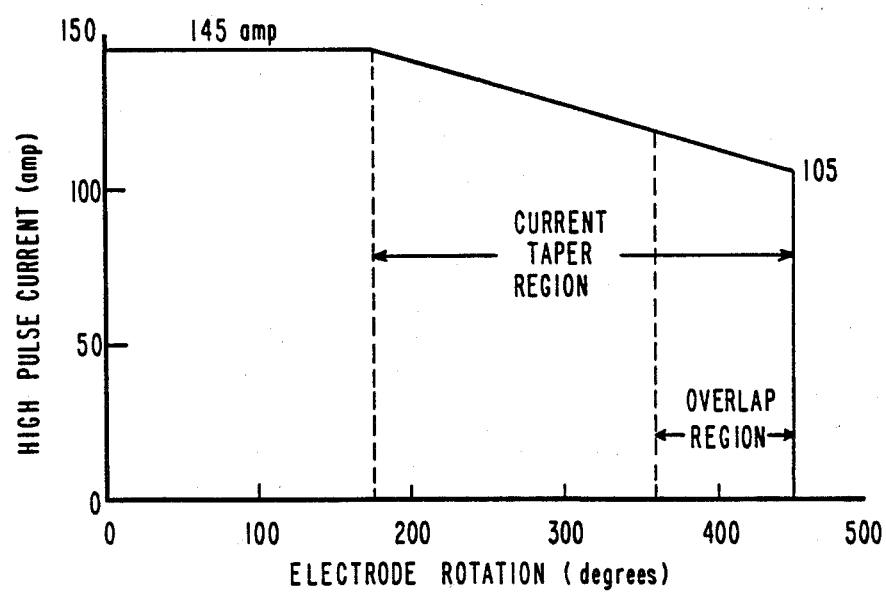
FIG. 5 is a graph of weld current v. electrode rotation.

When it is desired to repair a defective tube of a heat exchanger, the heat exchanger is deactived and drained of its coolant. Then the interior of the tube to be sleeved is cleaned and prepared for sleeving. The sleeve 26 is then inserted into the tube 22 in the position to bridge the defective area 24. Once in this position, an internal hydraulic expander may be inserted in the sleeve to selectively expand a limited portion of sleeve 26. It should be noted that under certain circumstances, internal expansion may not be necessary. Once sleeve 26 has thus been expanded into contact with tube 22, the welding apparatus 28 may be inserted into sleeve 26 as shown in FIG. 1. As welding apparatus 28 is inserted into sleeve 26, plunger 78 contacts the bottom of sleeve 26 and tube 22 thereby causing second flange 76, first gear 70, and central shaft 30 to move downwardly relative to housing 62 and sleeve 26. The downward relative motion of central shaft 30 causes first seal 50 and second seal 64 to be expanded into contact with the inner surface of sleeve 26 thereby creating a sealed gas passage. When in this position, an inert shielding gas may be introduced through center bore 32 and out through first hole 36. The shielding gas then fills the annulus between welding apparatus 28 and sleeve 26. The gas may be used to purge the welding zone by discharging the shielding gas through first channel 56, first annulus 66 and out through second channel 68. Once the welding zone has thus been purged, the shielding gas may be pressurized by regulating the back pressure on second channel 68. The welding zone may then be pressurized to between approximately 5 to 150 psi and preferably to between approximately 5 to 30 psi during the welding process. Once the weld zone has thus been pressurized, the electrical supply mechanism is energized which causes an electrical current to be conducted through central shaft 30 and through welding electrode 34. Welding electrode 34 then establishes a weld arc from weld electrode 34 to sleeve 26 in the area of sleeve 26 to be welded to tube 22. The current passing through welding electrode 34 may be between approximately 2-150 amps and generate a temperature in excess of 2300° F. For example, FIG. 5 depicts a typical high pulse current ramp that may be used in the welding process. The following parameters may be used with the pulsed mode illustrated in FIG. 5:

|  | Current (amps) | Duration (seconds) |
| --- | --- | --- |
| High Pulse | 50-250 | 0.01-1.0 |
| Low Pulse | 2-250 | 0.01-1.0 |

As the welding process continues a weld puddle is developed on the inner surface of sleeve 26. Since the interior of sleeve 26 is pressurized with the shield gas, the weld puddle is pressed against the inner surface of sleeve 26 and is not permitted to run down the side of sleeve 26. In this condition, the molten weld pool under the arc is continuously driven by the pressure gradient outward against the external tube 22. In this way the arc force is cushioned by the molten pool at all times during the welding process. Hence, an abrupt arc piercing through the sleeve 26 and tube 22 is avoided. Drive mechanism 74 is then activated which causes second gear and first gear 70 to rotate. The rotation of first gear 70 causes central shaft 30 to rotate about its longitudinal axis and causes weld electrode 34 to rotate in a 360° rotation about the inner surface of sleeve 26. The rotation of central shaft 30 and weld electrode 34 may be approximately 2-20 in/min and preferably 4-10 in/min which ensures a proper weld in sleeve 26. As the weld electrode 34 is rotated, a complete 360° internal weld of sleeve 26 to tube 22 is produced. The use of the internal gas shield pressure minimizes any problems due to non-uniform contact between sleeve 26 and tube 22. The gas pressruization also minimizes the problems associated with weld shrinkage and stress-relief distortion.

A method similar to the one described above may be sued to braze rather than weld the sleeve to the tube. In the braze method, sleeve 26 may be provided with a notch on the outside thereof in which a braze material such as a gold-nickel braze material may be deposited. This method may be similar to the braze method described in copending application Ser. No. 185,654 filed Sept. 9, 1980 in the name of R. D. Burack and entitled "Gold Braze Sleeving Method" which is assigned to the Westinghouse Electric Corporation. However, in the present braze method welding apparatus 28 may be used to internally heat sleeve 26 and the braze material to the proepr brazing temperature. In this case, sleeve 26 is not heated to its melting point so that a weld pool is not established. Rather, sleeve 26 is heated to the point where sleeve 26 is deformed by the internal pressurization of welding apparatus 28 so as to force sleeve 26 and the braze material into internal contact with tube 22. In this position, as welding apparatus 28 continues to rotate, the braze material is heated to its melting point while sleeve 26 and tube 22 are not melted but braze bonded together.

Therefore, it can be seen that the invention provides a pressure-differential method for internally joining a sleeve to a tube of a heat exchanger.

I claim as my invention:

1. A method for welding a metal sleeve within a metal tube comprising:
   positioning a metal sleeve in a metal tube;
   inserting a welding apparatus in said sleeve to position a welding electrode near the portion of said sleeve to be welded;
   actuating a sealing mechanism of said welding apparatus thereby defining a sealed chamber between siad sleeve and said welding apparatus near the portion of said sleeve to be welded;
   introducing an inert shielding gas through said welding apparatus and into said sealed chamber for pressurizing said sealed chamber to between approximately 5 to 150 psi;
   activating said welding apparatus to produce, through said electrode, a current of between approximately 2-150 amps for welding said sleeve to said tube while said shielding gas gently forces the molten weld material outwardly toward said tube thereby cushioning the weld arc force during the welding process; and
   rotating said welding apparatus about its longitudinal axis for completing a weld around the circumference of said sleeve.

2. The method according to claim 1 wherein said method further comprises internally expanding a limited portion of said sleeve into contact with the inner surface of said tube prior to inserting said welding apparatus into said sleeve.

3. The method according to claim 2 wherein said step of introducing an inert gas comprises introducing said inert gas at a pressure of between approximately 5 to 30 psi.

4. The method according to claim 3 wherein said method further comprises circulating said inert gas through said sealed chamber for purging said chamber of impurities prior to the welding process.

5. The method according to claim 4 wherein said step of rotating said welding apparatus comprises rotating said welding apparatus between approximately 20-20 inches per minute.

6. The method according to claim 5 wherein said step of rotating said welding apparatus comprises rotating said welding apparatus between approximately 4-10 inches per minute.

7. The method according to claim 6 wherein said step of activating said welding apparatus to produce a current further comprises:

establishing a current through said electrode of approximately 145 amps while said welding apparatus is rotated form 0° to approximately 200° of rotation; and linearly reducing the current through said electrode from approximately 145 amps to approximately 105 amps while said welding apparatus is rotated from approximately 200° to approximately 400° of rotation.

8. The method according to claim 7 wherein said inert shielding gas is argon.

9. The method according to claim 8 wherein said sleeve is a corrosion resistant metal sleeve.

10. The method according to claim 9 wherein said sleeve is an Inconel sleeve.

* * * * *